(12) United States Patent
Kumar et al.

(10) Patent No.: US 9,701,883 B2
(45) Date of Patent: *Jul. 11, 2017

(54) FRICTION REDUCER COMPOSITIONS (71) Applicant: MOMENTIVE PERFORMANCE MATERIALS INC., Waterford, NY (US)

(72) Inventors: Mukesh Kumar, White Plains, NY (US); Kalman Koczo, Suffern, NY (US); Kostas Spyropoulos, Mies (CH); John Terracina, Katy, TX (US); Mark D. Leatherman, Stamford, CT (US); Benjamin Falk, Yorktown Heights, NY (US); Olusegun Matthew Falana, Fulshear, TX (US)

(73) Assignee: Momentive Performance Materials Inc., Waterford, NY (US)

( * ) Notice: Subject to any disclaimer, the term of this patent is extended or adjusted under 35 U.S.C. 154(b) by 418 days.

This patent is subject to a terminal disclaimer.

(21) Appl. No.: 14/373,755

(22) PCT Filed: May 16, 2014

(86) PCT No.: PCT/US2014/038325
§ 371 (c)(1),
(2) Date: Jul. 22, 2014

(87) PCT Pub. No.: WO2014/186658
PCT Pub. Date: Nov. 20, 2014

(65) Prior Publication Data
US 2015/0240144 A1    Aug. 27, 2015

Related U.S. Application Data

(60) Provisional application No. 61/824,663, filed on May 17, 2013.

(51) Int. Cl.
 *C10M 115/08* (2006.01)
 *C09K 8/36* (2006.01)
 (Continued)

(52) U.S. Cl.
 CPC ............... *C09K 8/12* (2013.01); *C02F 1/68* (2013.01); *C09K 8/68* (2013.01); *C10M 107/42* (2013.01);
 (Continued)

(58) Field of Classification Search
 CPC .. C10M 2229/041; C09K 8/5083; C09K 8/62; C02F 1/50
 (Continued)

(56) References Cited

U.S. PATENT DOCUMENTS 3,624,019 A   11/1971   Anderson et al.
4,525,515 A    6/1985   Peignier et al.
(Continued)

FOREIGN PATENT DOCUMENTS

GB    2 146 260 A    4/1985

OTHER PUBLICATIONS

International Search Report and Written Opinion dated Jul. 9, 2014.

*Primary Examiner* — Vishal Vasisth
(74) *Attorney, Agent, or Firm* — Joseph S. Ostroff (57) ABSTRACT

A composition for treating an aqueous fluid includes an ionic polyacrylamide and a silicon polyether. The composition can be an oil-in-water emulsion or a water-in-oil emulsion. The ionic polyacrylamide can be an anionic polyacrylamide or a cationic polyacrylamide. The composition can be employed, for example, as a friction reducing additive for water based fracturing fluid, or a drilling mud additive.

17 Claims, 4 Drawing Sheets

A representation of vortex closure experiment (51) Int. Cl.
*C09K 8/588* (2006.01)
*E21B 43/26* (2006.01)
*C02F 1/68* (2006.01)
*C09K 8/12* (2006.01)
*C09K 8/68* (2006.01)
*C10M 107/42* (2006.01)
*C10M 107/50* (2006.01)
*C02F 103/10* (2006.01)

(52) U.S. Cl.
CPC ........... *C10M 107/50* (2013.01); *E21B 43/26* (2013.01); *C02F 2103/10* (2013.01); *C02F 2305/04* (2013.01); *C09K 2208/28* (2013.01); *C10M 2217/0245* (2013.01); *C10M 2229/0475* (2013.01)

(58) Field of Classification Search
USPC ............... 508/211; 507/120, 225; 166/308.2; 210/749
See application file for complete search history.

(56) References Cited

U.S. PATENT DOCUMENTS

| | | | |
|---|---|---|---|
| 5,110,853 A | 5/1992 | Van-Det et al. | |
| 2004/0260017 A1 | 12/2004 | Mertens et al. | |
| 2006/0106180 A1* | 5/2006 | Pantchev | C08F 220/06 526/303.1 |
| 2007/0299143 A1 | 12/2007 | Koczo et al. | |
| 2011/0184106 A1* | 7/2011 | Falk | C07F 7/0818 524/300 |

* cited by examiner

Figure 1. A representation of vortex closure experiment

Figure 2. Graphic representation of viscosity vs. time plot of mixing of HPAM-1 with Sil-10 at various concentrations in brine Figure 3. Schematic representation of mixing of polyacrylamide and silicon polyether in brine.

Figure 4. Graphic representation of viscosity vs. time plot of mixing of polyacrylamide and silicon polyether in brine

FRICTION REDUCER COMPOSITIONS

CROSS REFERENCE TO RELATED APPLICATIONS

The present application claims priority to PCT/US2014/038325 filed May 16, 2014, which claims priority to U.S. Provisional Application No. 61/824,663 filed May 17, 2013, each of which is herein incorporated by reference in its entirety.

BACKGROUND OF THE INVENTION

Field of the Invention

The present invention relates to polyacrylamides, and more particularly ionic polyacrylamides aided by silicon polyether copolymers for use as for example, friction or drag reducers used in water based hydraulic fracturing fluid, water purification and drilling mud additives.

Background of the Art

Polyacrylamides (PAM) are widely used as soil stabilizers, water purifier and friction reducers in agriculture, water and oil & gas industries, respectively. In the oil & gas industry, PAMs are used as additives in fracturing (fracking) and drilling applications. In fracturing, a large volume of water is injected under high pressure into the formation in order to fracture the rock formation (shale, sandstone, limestone, etc.) and this way deliberating crude oil and/or natural gas from the pores. In hydraulic fracturing applications, high molecular weight anionic and cationic polyacrylamides are used as friction reducers where the hydrated polymer suppresses the turbulence present in high velocity gradient water. Since hydraulic fracturing is performed at very high injection rate, reduction of pumping pressure as a results of friction reduction will result in less power consumption by the pumps and thus the use of effective friction reducers in the fracturing fluid can decrease the cost of the operation by a large margin.

The polyacrylamide molecules are sensitive to high shear, temperature and the ionic strength of the water used to solubilize them. At very high shear rate high molecular weight polyacrylamides are susceptible to breakdown into smaller chains. At high temperature and in alkaline conditions polyacrylamides hydrolyze to form acrylate fractions in the polymer chains, which produce negative charges on the polymer chains. The degree of hydrolysis increases with the temperature. Hydrolyzed polyacrylamides can remain stable in aqueous solutions in the absence of multivalent cations, such as $Ca^{2+}$, $Mg^{2+}$, $Fe^{3+}$, etc. However, as the concentration of these ions increases in water, the hydrolyzed polymers become more susceptible to form a complex with these ions and precipitate out from the water solution. The precipitated polyacrylamides do not hydrate effectively and the friction reduction diminishes. The, precipitated polyacrylamide clusters or particles can also damage the rock formations leading to reduced production of crude oil and/or natural gas.

In many of the fracturing jobs where fresh water is not accessible, formation water, frac fluid flow back water or recycled frac flow back water is frequently used. This water contains high concentration of monovalent and multivalent cations and anions. Therefore, a higher amount of friction reducer is needed to achieve the desired hydration of the polymer and friction reduction in such water. Increasing demand for fracturing water leads to consumption of more fresh water resources. Therefore, friction reducers, which can perform in all kinds of water, are desired.

The present invention discloses new friction reducer compositions for water based liquids comprising an ionic polyacrylamide and a silicon polyether, which are capable of delivering faster inversion of polyacrylamide emulsion and better hydration of the polymer chains needed to achieve maximum friction reduction in the brines consisting of high amount of monovalent cations, monovalent anions and multivalent cations. The silicon polyether copolymers disclosed in this invention are designed to be compatible with polyacrylamide emulsions.

SUMMARY OF THE INVENTION

The present invention provides herein a friction reducer composition for water based liquids comprising a) an ionic polyacrylamide and b) a silicon polyether.

In an embodiment the composition is preferably oil-in-water emulsion or water-in-oil emulsion.

Component "a" of the friction reducer composition is an ionic polyacrylamide emulsion which is normally prepared via emulsion co-polymerization of acrylamide and the desired co-monomer in a biphasic solvent system (for example, petroleum distillate oil and water). Total actives in these emulsions can be 20-50%. Component "b" of the friction reducer composition in this invention is a silicon polyether selected from the group consisting of a) silicone polyether(s) defined by the formula:

$R=(C_3H_6)O(C_2H_4O)_a(C_3H_6O)_b(C_4H_8O)_cZ$;
a=4-17;
b=0-26;
c=0-26 and
Z is H, acetyl or a monovalent hydrocarbon group containing from 1 to 12 carbon atoms;

b) silicone polyether(s) defined by the formula:

x=0-74;
y=1-10;
$R=(C_3H_6)O(C_2H_4O)_a(C_3H_6O)_b(C_4H_8O)_cZ$;
a=5-17;
b=0-26;
c=0-26 and
Z is H, acetyl or monovalent hydrocarbon group containing from 1 to 12 carbon atoms;

c) silicone polyether(s) defined by the formula:

x=4-100;
a=5-50 and
b=3-20;

d) silicone polyether(s) defined by the formula:

$R^1$=monovalent hydrocarbon radical containing 1-20 carbon atoms;
$R^2$=divalent linear or branched hydrocarbon radical containing 1-60 carbon atoms;
$R^4$=hydrocarbon radical containing 3-200 carbon atoms;
$R^5$=selected from a group consisting of oxygen or a divalent linear or branched hydrocarbon radical containing 1-60 carbon atoms;

R³, R⁶, R⁷ and R⁸=monovalent linear or branched hydrocarbon radical containing 1-200 carbon atoms;
a, b, c=0-3; subject to the limitation that a+b+c≤3 and
d, e=0-3; subject to the limitation that d+e≤3;
and
e) silicon polyether(s) defined by the formula:

x=3-17 and
Z is H, acetyl or a monovalent hydrocarbon group containing from 1 to 12 carbon atoms.

In an embodiment, the concentration of component "b" of the friction reducer composition is 1% to 9%.

In an embodiment the friction reducer composition is solid comprising ionic polyacrylamide (a) and said silicon polyether (b).

In another embodiment, the friction reducer composition can be added to water and/or brine at a dosage rate of from 0.25 to 5 gallons of friction reducer composition to 1,000 gallons of water and/or brine. The brine can contain up to 7.5% NaCl and 2.5% CaCl₂.

The composition herein is advantageously used as a viscosity modifier and friction reducer for water based fluids used in the oil and gas industry.

DETAILED DESCRIPTION OF THE INVENTION

In the specification and claims herein, the following terms and expression are to be understood as indicated.

As used in the specification and including the appended claims, the singular forms "a," "an," and "the" include the plural, and ref to a particular numerical value includes at least that particular value, unless the context clearly dictates otherwise.

Ranges can be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

As used herein, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

Other than in the working examples, claims, or where otherwise indicated, all numbers expressing amounts of materials, reaction conditions, time durations, quantified properties of materials, and so forth, stated in the specification are to be understood as being modified in all instances by the term "about."

Composition percentages are given in weight percent unless otherwise indicated.

It will be understood that any numerical range recited herein includes all sub ranges within that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The expression "hydrocarbon" means any hydrocarbon group from which one or more hydrogen atoms has been removed and is inclusive of alkyl, alkenyl, alkynyl, alkylene, cyclic alkyl, cyclic alkenyl, cyclic alkynyl, aryl, aralkyl and arenyl and may contain heteroatoms.

The term "alkyl" means airy monovalent, saturated straight, branched or cyclic hydrocarbon group; the term "alkenyl" means any monovalent straight, branched, or cyclic hydrocarbon group containing one or more carbon-carbon double bonds where the site of attachment of the group can be either at a carbon-carbon double bond or elsewhere therein; and, the term "alkynyl" means any monovalent straight, branched, or cyclic hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyls include methyl, ethyl, propyl and isobutyl. Examples of alkenyls include vinyl, propenyl, allyl, methallyl, ethylidenyl norbornane, ethylidene norbornyl, ethylidenyl norbornene and ethylidene norbornenyl. Examples of alkynyls include acetylenyl, propargyl and methylacetylenyl.

The expressions "cyclic alkyl", "cyclic alkenyl", and "cyclic alkynyl" include bicyclic, tricyclic and higher cyclic structures as well as the aforementioned cyclic structures further substituted with alkyl, alkenyl, and/or alkynyl groups. Representative examples include norbornyl, norbornenyl, ethylnorbornyl, ethylnorbornenyl, cyclohexyl, ethylcyclohexyl, ethylcyclohexenyl, cyclohexylcyclohexyl and cyclododecatrienyl.

The term "aryl" means ally monovalent aromatic hydrocarbon group; the term "aralkyl" means any alkyl group (as defined herein) in which one or more hydrogen atoms have been substituted by the same number of like and/or different aryl (as defined herein) groups; and the term "arenyl" means any aryl group (as defined herein) in which one or more hydrogen atoms have been substituted by the same number of like and/or different alkyl groups (as defined herein). Examples of aryls include phenyl and naphthalenyl. Examples of aralkyls include benzyl and phenethyl. Examples of arenyls include tolyl and xylyl.

It will be understood herein that all measures of viscosity are obtained at 25 degrees Celsius or room temperature unless noted otherwise.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

The present invention provides herein a friction reducer composition for water based liquids comprising a) an ionic polyacrylamide and b) a silicon polyether.

Component "a" of the aqueous friction reducer composition of the present invention is ionic polyacrylamide in an emulsion or in solid form. Anionic polyacrylamide is a copolymer of acrylamide and sodium acrylate monomers, which is also known as hydrolyzed polyacrylamide (HPAM) as shown in Schemes 1 and 2 below. These schemes illustrate polymer synthetic routes and structures. Synthetic procedures are well established in the literature. This category of polymers carries an overall negative charge due to the presence of acrylate or sulfonate fraction. About 5-95% of the co-monomers carry negative charge on the polymer backbone depending upon the monomers ratio used for polymerization. Cationic polyacrylamides (CPAM) are synthesized from acrylamide and a monomer containing quaternary ammonium group as shown in Scheme 3, which is shown to illustrate a polymer synthetic route and structure. The synthetic route is well established in literature. The ammonium groups contribute a positive charge in this category of polymers.

Inverse emulsions of polyacrylamides water-in-oil or w/o emulsions) are those in which the continuous phase is oil and the polyacrylamide is present in the aqueous emulsion drops (dispersed phase). Inverse emulsions of polyacrylamides are frequently used as friction reducers. When the inverse emulsion is diluted with water or brine then it inverts and the aqueous drop phase will deliver the polymers in the water or brine. An advantage of the water-in-oil emulsion form is that the polyacrylamide is partially hydrated in the aqueous drop phase and thus it will easier hydrated further, without making the emulsion highly viscous. Nevertheless even this hydration process takes time with the large polymers used here.

Scheme 1.

Schematic Representation of the Synthesis of Polyacrylamide, its Copolymer with Acrylate Monomer, and the Hydrolysis of Polyacrylamide

Scheme 2.

Schematic Representation of the Synthesis of an Anionic Polyacrylamide Containing Sulfonate Monomer (NaAMPS—Sodium Acrylamido-2-Methylpropanesulfonate)

Scheme 3.

Schematic Representation of the Synthesis of a Cationic Polyacrylamide Containing Ammonium Monomer (DMAEA-Q—Acryloyloxyethyltrimethyl Ammonium Chloride)

Emulsion type polyacrylamides suitable for use in the present invention include, for example, KemFlow A-4251, KemFlow A4355, KemFlow A-4356, KemFlow A-4358, KemFlow A-4361. KemFlow A-4366 (Kemira, Atlanta, Ga., USA); FLOJET DR-7000, FLOJET DR-3046 (SNF, Riceboro, Ga., USA); Sedifloc 320A, and Sedifloc, 331A (3F Chimica, Charlotte, N.C., USA) containing anionic; and Alcomer-788 and Alcomer-889 (BASF, Florham Park, N.J., USA) as cationic polyacrylamide emulsions and examples of solid (powder) polyacrylamides are KemFlow A-5156, KemFlow A-5157, KemFlow A-5251, KemFlow A-5252. KemFlow A-5253, KemFlow A-5254, KemFlow A-5351, KemFlow A-5352, KemFlow A-5353, KemFlow A-5354, KemFlow A-5356 (Kemira, Atlanta, Ga., USA); Sedifloc 7030HM, Sedifloc 7030HHM (3F Chimica, Charlotte, N.C., USA).

Anionic polyacrylamide polymers or hydrolyzed polyacrylamides are frequently abbreviated as HPAM, and cationic polyacrylamides are abbreviated as CPAM. These abbreviations are also used in this document.

Typical monovalent cations are $NH_4^+$, $Li^+$, $Na^+$, $K^+$, $Rb^+$, and $Cs^+$, typical divalent cations are $Be^{2+}$, $Mg^{2+}$, $Ca^{2+}$, $Sr^{2+}$, $Ba^{2+}$, $Fe^{2+}$, $Cu^{2+}$, $Zn^{2+}$; and typical bivalent cations are $Fe^{3+}$, $Al^{3+}$, etc. Typical monovalent anions are $F^-$, $Cl^-$, $Br^-$, $NO_3^-$, $HCO_3^-$, $HSO_4^-$; and divalent anions are $SO_4^{2-}$, $CO_3^{2-}$, etc.

The term 'brine' refers to a solution of water and electrolytes such as sodium chloride, potassium chloride, calcium chloride. These may be further denoted as 7.5% NaCl, 7% KCl and 2.5% $CaCl_2$ or a combination of these which are normally weight % or otherwise reported.

The term 'high brine' is used when the concentration of the electrolytes present exceeds a certain value and has greater effect on the performance of the polymer. High brines may be, for example, seawater, or recycled water/flow back (produced) water from stimulation of the wells, etc.

The term 'API brine' refers to the definition of brine used by the American Petroleum Institute (API). In this invention 10% API brine was prepared by dissolving 7.5 wt % NaCl and 2.5 wt % $CaCl_2$ in DI (deionized) water.

'Friction reducers' for water based liquids are the chemical additives added to the aqueous liquids to reduce the friction coefficient during turbulent flow, for example during hydraulic fracturing of subterranean formations. These additives lower the friction or drag by suppressing the turbulence present in high velocity gradient water and as a result water can flow faster. Polymers, other than polyacrylamides, with friction reducing action can be high molecular weight linear homo or copolymers of styrene/N-vinylpyridine, ethene/α-olefins, isobutene, (meth)acrylic esters, divinylbenzene/1-hexene/1-octene/1-decene, acrylamide/acrylate, styrene/methylstyrenesulfonate/N-vinylpyridine etc.

The dose of friction reducer is typically 0.25 gallon per 1000 gallon to 5-gallon per 1000 gallon of water.

In hydraulic fracturing, anionic polyacrylamides are used typically as efficient friction reducers, unless clay swell inhibitor such as KCl and polyDADMAC (Polydiallyldimethylammonium chloride) are used, when cationic polyacrylamides are typically used. Friction reducers are normally added in-line and therefore they need to dissolve in a short time, typically in less than 2 minutes. For this reason, emulsions are preferred to powders. The water based liquid in hydraulic fracturing can be anything from fresh water to heavy brine containing high concentrations of salts, including multivalent cations such as $Fe^{3+}$, $Mg^{2+}$, $Ca^{2+}$, $Ba^{2+}$, and $Sr^{2+}$, etc.

'Fracturing fluid' used in hydraulic fracturing or fracking is defined as the mixture of large amount of fresh or salt water (85-95%), sand, ceramic or resin coated proppant (5-15%) and <0.5% chemical additives such as friction reducers, viscosifiers, fluid loss additives, breakers, emulsifiers, surfactants, non-emulsifiers, pH control additives, cross-linkers, gel stabilizers, biocides etc. The total amount of fracturing fluid used per well may be 1-4 million US gallons.

In an embodiment of the present invention component "b" of the friction reducer composition in this invention is selected from the group consisting of a) silicone polyether(s) defined by the formula:

$Me_3Si—O—SiMe(R)—O—SiMe_3$, $R=(C_3H_6)O(C_2H_4O)_a(C_3H_6O)_b(C_4H_8O)_cZ$;

a=4-17;

b=0-26;

c=0-26 and

Z is H, acetyl or a monovalent hydrocarbon group containing from 1 to 12 carbon atoms;

b) silicone polyether(s) defined by the formula:

$Me_3Si—[OSiMe_2]_x—[O—SiMe(R)]_y—O—SiMe_3$, x=0-74;

y=1-10;

$R=(C_3H_6)O(C_2H_4O)_a(C_3H_6O)_b(C_4H_8O)_cZ$;

a=5-17;

b=0-26;

c=0-26 and

Z is H, acetyl or a monovalent hydrocarbon group containing from 1 to 12 carbon atoms;

c) silicone polyether(s) defined by the formula;

{[$CH_2CH(OH)CH_2O(CH_2)_3SiMe_2$-O—[$SiMe_2O$]$_x$—$SiMe_2$-($CH_2)_3OCH_2CH(OH)$][(H)NCH—($CH_3$)—$CH_2O(C_3H_6O)_b(C_2H_4O)_aCH_2CH(CH_3)$ N(H)]} x=4-100;

a=5-50 and b=3-20;

d) silicone polyether(s) defined by the formula

H—[N(H)(R$^1$)R$^2$Si(OR$^3$)$_{3-a-b-c}$(OR$^4$)$_a$(R$^5$Si(OR$^6$)$_d$ (R$^7$)$_e$)$_b$R$^8$$_c$]—N(H)(R$^1$)R$^2$Si(OR$^3$)$_3$,

R$^1$=monovalent hydrocarbon radical containing 1-20 carbon atoms;

R$^2$=divalent linear or branched hydrocarbon radical containing 1-60 carbon atoms;

R$^4$=hydrocarbon radical containing 3-200 carbon atoms;

R$^5$=selected from a group consisting of oxygen or a divalent linear or branched hydrocarbon radical containing 1-60 carbon atoms;

$R^3$, $R^6$, $R^7$ and $R^8$=and monovalent linear or branched hydrocarbon radical containing 1-200 carbon atoms;
a, b, c=0-3; subject to the limitation that a+b+c≤3 and
d, e=0-3; subject to the limitation that d+e≤3;
and
e) silicon polyether(s) defined by the formula:

Me$_3$Si(C$_2$H$_4$)SiMe$_2$(C$_3$H$_6$O)(C$_2$H$_4$O)$_x$Z, x=3-17 and
Z is H, acetyl or a monovalent hydrocarbon group containing from 1 to 12 carbon atoms.

Applications for the Embodiments of the Invention:

(1) Friction Reduction.

Friction reducing emulsions normally comprise a class of high molecular weight linear polymers. These can be neutral, anionic or cationic in nature. The charge on these polymers comes from the co-monomer used in the preparation. Such emulsions may contain surfactants. The present invention describes the use of silicon polyether copolymers as hydration aids for polyacrylamide polymer used as friction reducer in water based liquids. The silicon polyether copolymers are suitable and compatible with polyacrylamide emulsions used in hydraulic fracturing applications. The availability of fresh water in some oil and gas fields is declining as the hydraulic fracturing operations are increasing to extract more and more crude oil and natural gas from rock formations. Thus the use of produced or flow-back water or recycled water remains a viable option. Recycling of produced water is an expensive process and costs more to oil and gas industry. Produced or flow-back water as such contains large amount of salts, which may consist of a variety of mono and multivalent cations/anions and many of the anionic friction reducers fail to produce strong friction reduction in such water. Silicon polyether copolymers can accelerate the hydration of polyacrylamide polymer chains. These can be mixed with polyacrylamide emulsions prior or added at the time of injection for hydraulic fracturing. The solubility of silicon polyether copolymers in various brines makes them suitable additives for oil and gas field applications.

(2) Drilling Mud Additive

Polyacrylamides are used as drilling mud additives as well as for enhanced oil recovery. Drilling muds are pumped into well bores during drilling operations for crude oil and natural gas production. These are used as fluid loss additives. Superior hydration of polyacrylamides in the presence of silicon polyether can improve fluid loss additive property of the polyacrylamide polymer.

EXAMPLES

Polyacrylamides:
HPAM-1: KemFlow A-4361 (38% solid contents),
HPAM-2: KemFlow A-4358 (46% solid contents),
HPAM-3: KemFlow A-4355 (32% solid contents),
HPAM-4: KemFlow A4356 (21% solid contents).
HPAM-5: KemFlow A4251 (40% solid contents) emulsions containing anionic polyacrylamide with petroleum distillate as a continuous phase and,
HPAM-6: KemFlow A-5253 in solid form are made by Kemira (Atlanta, Ga., USA).
HPAM-7: DR-7000 (37% solid contents) and
HPAM-8: DR-3046 (36% solid contents) emulsions are made by SNF (Riceboro, Ga., USA) and contain anionic polyacrylamide with petroleum distillate as a continuous phase.
HPAM-9: Sedifloc 320A (38% solid contents) and
HPAM-10: Sedifloc 331A (40% solid contents) emulsions are made by 3F Chimica (Charlotte, N.C., USA) and contain anionic polyacrylamide with petroleum distillate as a continuous phase.
CPAM-1: Alcomer 889 (47% solid contents) and
CPAM-2: Alcomer 788 (51% solid contents) emulsions are made by BASF (Florham Park, N.J., USA) and contain cationic polyacrylamide.

Silicon containing polyether copolymers have the following formulae:
Sil-1: Me$_3$Si—O—SiMe(R)—O—SiMe$_3$ [80% with R=(C$_3$H$_6$)O(C$_2$H$_4$O)$_{7.5}$Me and 20% with R=(C$_3$H$_6$)O(C$_2$H$_4$O)$_{7.5}$H].
Sil-2: Me$_3$Si—O—SiMe(R)—O—SiMe [R=(C$_3$H$_6$)O(C$_2$H$_4$O)$_{7.5}$Me].
Sil-3: Me$_3$Si—O—SiMe(R)—O—SiMe$_3$ [R=(C$_3$H$_6$)O(C$_2$H$_4$O)$_9$Me].
Sil-4: Me$_3$Si—O—SiMe(R)—O—SiMe$_3$ [R=(C$_3$H$_6$)O(C$_2$H$_4$O)$_{7.5}$H].
Sil-5: Me$_3$Si—O—SiMe(R)—O—SiMe$_3$ [R=(C$_3$H$_6$)O(C$_2$H$_4$O)$_{7.5}$COMe].
Sil-6: Me$_3$Si—O—SiMe(R)—O—SiMe$_3$ [R=(C$_3$H$_6$)O(C$_2$H$_4$O)$_{12}$H].
Sil-7: Me$_3$Si—O—SiMe(R)—O—SiMe$_3$ [R=(C$_3$H$_6$)O(C$_2$H$_4$O)$_{12}$Me].
Sil-8: Me$_3$Si—O—SiMe(R)—O—SiMe$_3$ [R=(C$_3$H$_6$)O(C$_2$H$_4$O)$_{17}$H].
Sil-9: Me$_3$Si—O—SiMe(R)—O—SiMe$_3$ [R=(C$_3$H$_6$)O(C$_2$H$_4$O)$_{17}$Me].
Sil-10: Me$_3$Si—O—SiMe(R)$_{1.9}$—O—SiMe$_3$ [R=(C$_3$H$_6$)O(C$_2$H$_4$O)$_{7.5}$Me].
Sil-11: Me$_3$Si—[O—SiMe(R)]$_{1.9}$—O—SiMe$_3$ [R=(C$_3$H$_6$)O(C$_2$H$_4$O)$_9$Me].
Sil-12: Me$_3$Si—[O—SiMe(R)]$_{1.9}$—O—SiMe$_3$ [R=(C$_3$H$_6$)O(C$_2$H$_4$O)$_{12}$Me].
Sil-13: Me$_3$Si—[OSiMe$_2$]$_{5.2}$—[O—SiMe(R)]$_{7.6}$—O—SiMe$_3$ [R=(C$_3$H$_6$)O(C$_2$H$_4$O)$_{7.5}$Me].
Sil-14: Me$_3$Si—[OSiMe$_2$]$_{15}$—[O—SiMe(R)]$_{5.5}$—O—SiMe$_3$ [R=(C$_3$H$_6$)O(C$_2$H$_4$O)$_{7.5}$H].
Sil-15: Me$_3$Si—[OSiMe$_2$]$_{74}$—[O—SiMe(R)]$_9$—O—SiMe$_3$ [R=(C$_3$H$_6$)O(C$_2$H$_4$O)$_3$(C$_3$H$_6$O)$_{5.8}$H].
Sil-16: Me$_3$Si—[OSiMe$_2$]$_{43}$—[O—SiMe(R)]$_{6.8}$—O—SiMe$_3$ [R=(C$_3$H$_6$)O(C$_2$H$_4$O)$_{12}$(C$_3$H$_6$O)$_3$H].
Sil-17: MeSi—[OSiMe$_2$]$_{18}$—[O—SiMe(R)]$_{4.5}$—O—SiMe$_3$ [R=(C$_3$H$_6$)O(C$_2$H$_4$O)$_{17.5}$H].
Sil-18: H(OC$_2$H$_4$)$_{12}$—O—(CH$_2$)$_3$—SiMe$_2$-[OSiMe$_2$]$_{10}$—OSiMe$_2$-[C$_3$H$_6$)O(C$_2$H$_4$O)$_{12}$]—H.
Sil-19: {[CH$_2$CH(OH)CH$_2$O(C$_3$H$_6$)SiMe$_2$-O—[SiMe$_2$O]$_{100}$—SiMe$_2$-(C$_3$H$_6$)OCH$_2$CH(OH)][HNCH(CH$_3$)CH$_2$O(C$_3$H$_6$(C$_2$H$_4$O)$_{39}$CH$_2$CH(CH$_3$)NH]}.
Sil-20: (C$_3$H$_7$O)$_3$Si(C$_3$H$_6$)HN—[CH$_2$CH(OH)CH$_2$O(C$_2$H$_4$O)$_{12}$CH$_2$CH(OH)CH$_2$N(C$_3$H$_6$)Si(OC$_3$H$_7$)$_3$]—H.
Sil-21: Me$_3$Si(C$_2$H$_4$)SiMe$_2$(C$_3$H$_6$O)(C$_2$H$_4$O)$_{7.5}$Me.

These polyether copolymers were made with standard procedures.

TESTING EXAMPLES

Example 1

Run 1. To a 250 mL plastic beaker was added 150 mL of 10% brine containing 7.5% NaCl and 2.5% CaCl$_2$ (API brine) in deionized water. An overhead mixer with four propeller blades was used to create a vortex. The position of the propeller was fixed in the center at 2" from the bottom of the beaker. The speed of the mixer was set to 800 RPM. The brine in the beaker was allowed to mix at set RPM to create a vortex. To this vortex 5.0 g HPAM-1 (3.33 wt %) was injected. The vortex closure was observed from top view and as the time for the vortex to close was recorded.

Figure 1:
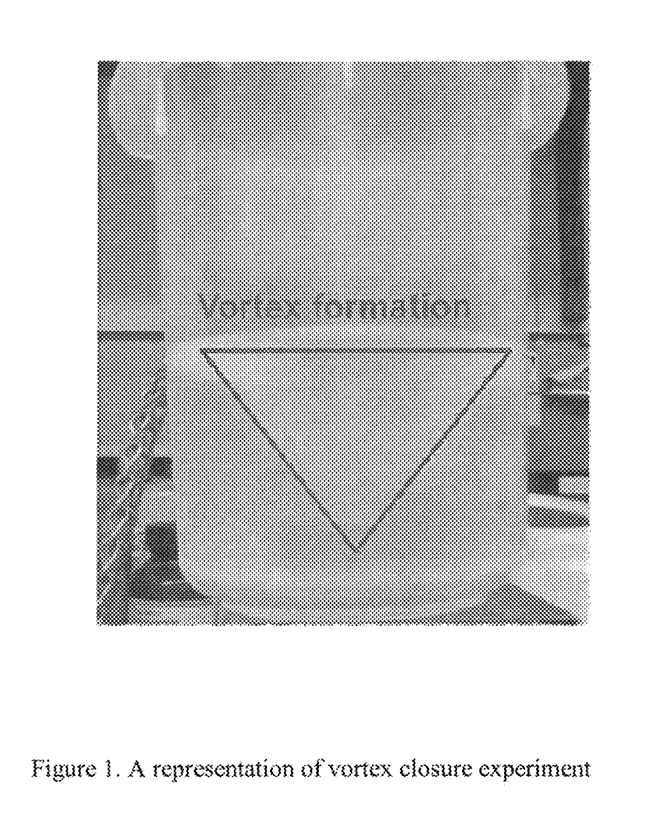
FIG. 1 is a representation of a vortex closure experiment.

FIG. 1 shows a vortex formation in brine when 800 rpm mixing is applied.

Runs 2-11. Run-1 was repeated except in these runs 0.5% of silicon polyether (Sil-1, Sil-10, and Sil 13-20) was solubilized in 10% brine prior to the addition of 3.33 wt % HPAM-1.

The data from vortex closure experiments (Table 1, Runs 2-11) demonstrate faster inversion of the anionic HPAM-1 emulsion and accelerated hydration of the anionic polyacrylamide polymer chains in the presence of silicon polyether copolymers.

TABLE 1

Composition and vortex closure data of HPAM-1 with various silicon polyether copolymers

|  | HPAM-1 | Silicon polyether | Vortex Closure Time (sec.) | Decrease in Vortex Closure Time (%) |
|---|---|---|---|---|
| Run-1 | 3.33% | None | 177 | None |
| Run-2 | 3.33% | Sil-1, 0.5% | 74 | 58 |
| Run-3 | 3.33% | Sil-10, 0.5% | 40 | 77 |
| Run-4 | 3.33% | Sil-13, 0.5% | 70 | 61 |
| Run-5 | 3.33% | Sil-14, 0.5% | 54 | 70 |
| Run-6 | 3.33% | Sil-15, 0.5% | 100 | 44 |
| Run-7 | 3.33% | Sil-16, 0.5% | 120 | 32 |
| Run-8 | 3.33% | Sil-17, 0.5% | 100 | 44 |
| Run-9 | 3.33% | Sil-18, 0.5% | 160 | 10 |
| Run-10 | 3.33% | Sil-19, 0.5% | 150 | 15 |
| Run-11 | 3.33% | Sil-20, 0.5% | 45 | 75 |

First, HPAM-1 was blended with 1-9% of silicon polyether copolymers and all the formulations were aged for 24 hours at room temperature before measurement. Then 1.66 wt % of HPAM-1 or Formulations 1-12, as described in Table 2, were injected to a measured amount of API brine and the viscosity of the solutions was monitored for 300 s. 'Hydration viscosity' in the table refers to the viscosity value obtained after hydration of the polyacrylamide polymer in brine during rheology experiment.

"% Improvement in Hydration Viscosity" of polyacrylamide is calculated by referencing the hydration viscosity of HPAM-1 obtained at 300 s. All the experiments were conducted in identical experimental conditions.

'Viscosity' refers to the bulk viscosity of the polyacrylamide emulsion or blended mixture of polyacrylamide emulsion and silicon polyether. This was measured with a Brookfield RV Viscometer DV-III Ultra (Brookfield, Middleboro, Mass., USA) at room temperature using #7 spindle at 100 rpm.

'Tolerance of brine' refers to the capacity of polyacrylamide polymer to get hydrated in the brine. This was qualitatively determined based on the physical appearance of the resultant fluid from rheology experiment. "Good" rating means no precipitation or flocculation, "Fair" rating means that only moderate precipitation or flocculation, while "Bad" rating means that strong precipitation or flocculation was observed.

'Hydration viscosity' refers to the viscosity value obtained after hydration of the polyacrylamide polymer in brine during rheology experiment. The viscosity data is reported in centipoise (cP) unit or otherwise noted.

TABLE 2

Composition, viscosity, rheology and brine tolerance of the formulations containing HPAM-1 and silicon polyether copolymers

|  | Composition and Viscosity | | | Rheology | | |
|---|---|---|---|---|---|---|
|  | HPAM-1 (wt. %) | Silicon polyether | Viscosity (cP) | Hydration Viscosity (cP) | % Improvement in Hydration Viscosity | Tolerance of Brine |
| HPAM-1 | 100 | None | 1320 | 14 | None | Fair |
| Formulation 1 | 97 | Sil-10, 3% | 1500 | 19 | 36 | Fair |
| Formulation 2 | 99 | Sil-10, 1% | 1400 | 23 | 64 | Good |
| Formulation 3 | 94 | Sil-13, 6% | 1480 | 20 | 43 | Fair |
| Formulation 4 | 99 | Sil-13, 1% | 1440 | 22 | 57 | Good |
| Formulation 5 | 94 | Sil-1, 6% | 2400 | 25 | 79 | Best |
| Formulation 6 | 99 | Sil-1, 1% | 1600 | 19 | 36 | Fair |
| Formulation 7 | 94 | Sil-6, 6% | 2200 | 19 | 36 | Fair |
| Formulation 8 | 99 | Sil-6, 1% | 1440 | 21 | 50 | Good |
| Formulation 9 | 99 | Sil-8, 1% | 1400 | 21 | 50 | Good |
| Formulation 10 | 97 | Sil-8, 3% | 1880 | 18 | 29 | Fair |
| Formulation 11 | 97 | Sil-21, 3% | 2160 | 23 | 64 | Good |
| Formulation 12 | 99 | Sil-21, 1% | 1520 | 18 | 29 | Fair |

Example 2

A rheometer, model Physica MCR 301 (Anton Par, Ashland, Va., USA) was used to investigate the rheological properties of the polyacrylamide polymers and the new compositions using the coaxial cylinder measuring system (Bob Radius 13.331 mm, Cup Radius 14.460 mm, Measuring Gap 1.129 mm). All the experiments were carried out at 25° C. and at 2500 $s^{-1}$ shear rate.

Example 3

Referring to Table 3 below, Formulations 13-22 were prepared using HPAM-2 and silicon polyether copolymers similarly to formulations 1-12. The measurements were performed similar to Example-2. These Formulations showed 17-266% improvement in the hydration viscosity of the polyacrylamide.

TABLE 3

Composition, viscosity, rheology and brine tolerance of the formulations containing HPAM-2 and silicon polyether copolymer

|  | Composition and Viscosity | | | Rheology | | |
| --- | --- | --- | --- | --- | --- | --- |
|  | HPAM-2 (wt. %) | Silicon polyether | Viscosity (cP) | Hydration Viscosity (cP) | % Improvement in Hydration Viscosity | Tolerance of Brine |
| HPAM-2 | 100 | None | 1040 | 6 | None | Bad |
| Formulation 13 | 94 | Sil-2, 6% | 1240 | 20 | 233 | Best |
| Formulation 14 | 94 | Sil-1, 6% | 1340 | 12 | 100 | Good |
| Formulation 15 | 94 | Sil-4, 6% | 1920 | 22 | 266 | Best |
| Formulation 16 | 94 | Sil-5, 6% | 1680 | 12 | 100 | Good |
| Formulation 17 | 94 | Sil-3, 6% | 1260 | 16 | 166 | Good |
| Formulation 18 | 94 | Sil-7, 6% | 2000 | 13 | 116 | Good |
| Formulation 19 | 99 | Sil-10, 1% | 1680 | 6 | 0 | Bad |
| Formulation 20 | 97 | Sil-10, 3% | 4880 | 13 | 116 | Good |
| Formulation 21 | 99 | Sil-13, 1% | 1920 | 7 | 17 | Bad |
| Formulation 22 | 97 | Sil-13, 3% | 4080 | 15 | 150 | Good |

Example 4

Referring to Table 4 below, Formulations 23-28 were prepared using HPAM-3 and silicon polyether copolymers similarly to formulations 1-12. The measurements were performed similar to Example-2. These Formulations showed 183-350% improvement in the hydration viscosity of the polyacrylamide.

TABLE 4

Composition, viscosity, rheology and brine tolerance of the formulations containing HPAM-3 and silicon polyether copolymers

|  | Composition and Viscosity | | | Rheology | | |
| --- | --- | --- | --- | --- | --- | --- |
|  | HPAM-3 (wt. %) | Silicon polyether | Viscosity (cP) | Hydration Viscosity (cP) | % Improvement in Hydration Viscosity | Tolerance of Brine |
| HPAM-3 | 100 | None | 560 | 6 | None | Bad |
| Formulation 23 | 94 | Sil-2, 6% | 2080 | 17 | 183 | Good |
| Formulation 24 | 94 | Sil-4, 6% | 3400 | 23 | 283 | Good |
| Formulation 25 | 97 | Sil-10, 3% | 1000 | 23 | 282 | Good |
| Formulation 26 | 97 | Sil-11, 3% | 960 | 26 | 333 | Best |
| Formulation 27 | 97 | Sil-12, 3% | 880 | 22 | 266 | Good |
| Formulation 28 | 97 | Sil-13, 3% | 600 | 27 | 350 | Best |

Example 5

Referring to Table 5 below, Formulations 29-33 were prepared using HPAM-5 and silicon polyether copolymers similarly to formulations 1-12. The measurements were performed similar to Example-2. These Formulations showed up to 100% improvement in the hydration viscosity of the polyacrylamide.

TABLE 5

Composition, viscosity, rheology and brine tolerance of the formulations containing HPAM-5 and silicon polyether copolymers

|  | Composition and Viscosity | | | Rheology | | |
| --- | --- | --- | --- | --- | --- | --- |
|  | HPAM-5 (wt. %) | Silicon polyether | Viscosity (cP) | Hydration Viscosity (cP) | % Improvement in Hydration Viscosity | Tolerance of Brine |
| HPAM-5 | 100 | None | 2040 | 14 | None | Good |
| Formulation 29 | 97 | Sil-2, 3% | 2560 | 27 | 93 | Best |
| Formulation 30 | 97 | Sil-4, 3% | 3240 | 28 | 100 | Best |
| Formulation 31 | 97 | Sil-6, 3% | 3960 | 14 | 0 | Bad |
| Formulation 32 | 97 | Sil-10, 3% | 3200 | 17 | 21 | Fair |
| Formulation 33 | 97 | Sil-13, 3% | 2680 | 16 | 14 | Fair |

Example 6

Referring to Table 6 below. Formulations 34-41 were prepared using HPAM-7 and silicon polyether copolymers similarly to formulations 1-12. The measurements were performed similar to Example-2. These Formulations showed 33-350% improvement in the hydration viscosity or the polyacrylamide.

TABLE 6

Composition, viscosity, rheology and brine tolerance of the formulations containing HPAM-7 and silicon polyether copolymers

| | Composition and Viscosity | | | Rheology | | |
|---|---|---|---|---|---|---|
| | HPAM-7 (wt. %) | Silicon polyether | Viscosity (cP) | Hydration Viscosity (cP) | % Improvement in Hydration Viscosity | Tolerance of Brine |
| HPAM-7 | 100 | None | 640 | 6 | None | Bad |
| Formulation 34 | 91 | Sil-1, 9% | 1360 | 27 | 350 | Best |
| Formulation 35 | 97 | Sil-1, 3% | 880 | 13 | 117 | Good |
| Formulation 36 | 97 | Sil-6, 3% | 3040 | 17 | 183 | Good |
| Formulation 37 | 99 | Sil-6, 1% | 800 | 8 | 33 | Fair |
| Formulation 38 | 97 | Sil-10, 3% | 1840 | 23 | 282 | Best |
| Formulation 39 | 99 | Sil-10, 1% | 840 | 12 | 100 | Good |
| Formulation 40 | 91 | Sil-13, 9% | 360 | 27 | 350 | Best |
| Formulation 41 | 99 | Sil-13, 1% | 680 | 21 | 250 | Best |

Example 7

Referring to Table 7 below, Formulations 42-46 were prepared using HPAM-9 and silicon polyether copolymers similarly to formulations 1-12. The measurements were performed similar to Example-2. These Formulations showed 33-233% improvement in the hydration viscosity of the polyacrylamide.

TABLE 7

Composition, viscosity, rheology and brine tolerance of the formulations containing HPAM-9 and silicon polyether copolymers

| | Composition and Viscosity | | | Rheology | | |
|---|---|---|---|---|---|---|
| | HPAM-9 (wt. %) | Silicon polyether | Viscosity (cP) | Hydration Viscosity (cP) | % Improvement in Hydration Viscosity | Tolerance of Brine |
| HPAM-9 | 100 | None | 960 | 6 | None | Bad |
| Formulation 42 | 94 | Sil-1, 6% | 1280 | 17 | 183 | Good |
| Formulation 43 | 94 | Sil-4, 6% | 1880 | 20 | 233 | Best |
| Formulation 44 | 97 | Sil-4, 3% | 1560 | 19 | 217 | Best |
| Formulation 45 | 97 | Sil-10, 3% | 2920 | 18 | 200 | Best |
| Formulation 46 | 97 | Sil-13, 3% | 2160 | 8 | 33 | Fair |

Example 8

Referring to Table 8 below, Formulations 47-51 were prepared using HPAM-10 and silicon polyether copolymers similarly to formulations 1-12. The measurements were performed similar to Example-2. These Formulations showed 33-183% improvement in the hydration viscosity of the polyacrylamide.

TABLE 8

Composition, viscosity, rheology and brine tolerance of the formulations containing HPAM-10 and silicon polyether copolymers

| | Composition and Viscosity | | | Rheology | | |
|---|---|---|---|---|---|---|
| | HPAM-10 (wt. %) | Silicon polyether | Viscosity (cP) | Hydration Viscosity (cP) | % Improvement in Hydration Viscosity | Tolerance of Brine |
| HPAM-10 | 100 | None | 1320 | 6 | None | Bad |
| Formulation 47 | 94 | Sil-1, 6% | 1400 | 17 | 183 | Best |
| Formulation 48 | 94 | Sil-4, 6% | 2280 | 15 | 150 | Good |
| Formulation 49 | 97 | Sil-4, 3% | 1960 | 13 | 117 | Good |

TABLE 8-continued

Composition, viscosity, rheology and brine tolerance of the formulations containing HPAM-10 and silicon polyether copolymers

| | Composition and Viscosity | | | Rheology | | |
|---|---|---|---|---|---|---|
| | HPAM-10 (wt. %) | Silicon polyether | Viscosity (cP) | Hydration Viscosity (cP) | % Improvement in Hydration Viscosity | Tolerance of Brine |
| Formulation 50 | 97 | Sil-10, 3% | 1640 | 10 | 67 | Fair |
| Formulation 51 | 97 | Sil-13, 3% | 2000 | 8 | 33 | Fair |

Example 9

Referring to Table 9 below, Formulations 52-55 were prepared using CPAM-1 and silicon polyether copolymers similarly to formulations 1-12. The measurements were performed similar to Example-2. These Formulations showed 183-467% improvement in the hydration viscosity of the polyacrylamide.

TABLE 9

Composition, viscosity, rheology and brine tolerance of the formulations containing CPAM-1 and silicon polyether copolymers

| | Composition and Viscosity | | | Rheology | | |
|---|---|---|---|---|---|---|
| | CPAM-1 (wt. %) | Silicon polyether | Viscosity (cP) | Hydration Viscosity (cP) | % Improvement in Hydration Viscosity | Tolerance of Brine |
| CPAM-1 | 100 | None | 520 | 6 | None | Bad |
| Formulation 52 | 97 | Sil-1, 3% | 680 | 17 | 183 | Good |
| Formulation 53 | 97 | Sil-6, 3% | 920 | 17 | 183 | Good |
| Formulation 54 | 97 | Sil-10, 3% | 440 | 32 | 433 | Best |
| Formulation 55 | 97 | Sil-13, 3% | 400 | 34 | 467 | Best |

Example 10

Referring to Table 10 below, Formulations 56-59 were prepared using CPAM-2 and silicon polyether copolymers similarly to formulations 1-12. The measurements were performed similar to Example-2. These Formulations showed improvement in the hydration viscosity of the polyacrylamide.

TABLE 10

Composition, viscosity, rheology and brine tolerance of the formulations containing CPAM-2 and silicon polyether copolymers

| | Composition and Viscosity | | | Rheology | | |
|---|---|---|---|---|---|---|
| | CPAM-2 (wt. %) | Silicon polyether | Viscosity (cP) | Hydration Viscosity (cP) | % Improvement in Hydration Viscosity | Tolerance of Brine |
| CPAM-2 | 100 | None | 400 | 23 | None | Good |
| Formulation 56 | 97 | Sil-1, 3% | 400 | 24 | 4 | Good |
| Formulation 57 | 97 | Sil-6, 3% | 400 | 25 | 13 | Good |
| Formulation 58 | 97 | Sil-10, 3% | 400 | 27 | 17 | Good |
| Formulation 59 | 97 | Sil-13, 3% | 400 | 25 | 13 | Good |

Example 11

0.5 wt % of HPAM-6 was added to a measured amount of the 10% brine containing 0.4 wt % silicon polyether, Sil-10. The contents were then mixed for 20 minutes at 800 rpm. The viscosity of the resulting fluid was recorded as 17 cP by using the method described in Example 2. When a similar amount of HPAM-6 was used and no silicon polyether was added, a low viscosity (13 cP) was observed in an identical experimental condition. This example showed 30% improvement in the hydration viscosity of polyacrylamide polymer in 20 minutes in the presence of silicon polyether.

Example 12

Figure 2:
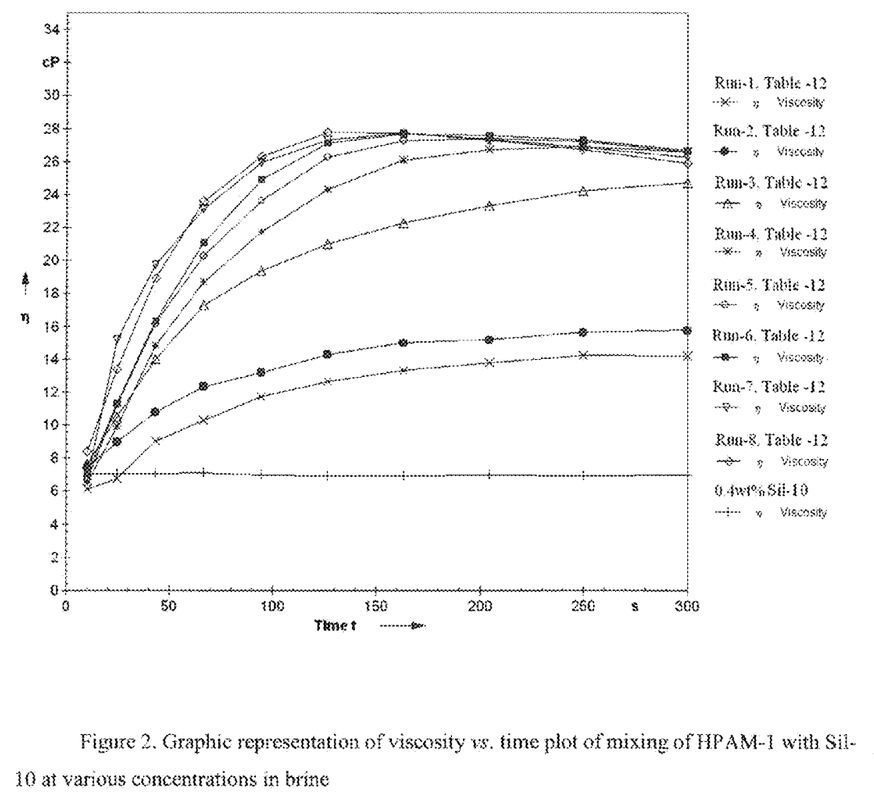
FIG. 2 is a graphic representation of viscosity is time plots of mixing of polyacrylamide emulsion HPAM-1 with silicon polyether (Sil-10) at various concentrations in brine.

Referring to Table 12 below, HPAM-1 was used to measure the effect of the concentration of silicon polyether copolymer on the hydration of polyacrylamide polymer. The data showed that a very small amount (0.005% silicon polyether with 1.66 wt % polymer emulsion HPAM-1) of Sil-10 can trigger the inversion of emulsion and accelerate the hydration of polymer. 0.05 wt % 0.1 wt % silicon polyether copolymer can improve up to 100% hydration of polyacrylamide in 120 s of mixing (FIG. 2). FIG. 2 shows viscosity vs. time plots obtained from rheology experiments.

TABLE 12

Effect of silicon polyether concentration on the hydration viscosity of anionic polyacrylamide polymer (HPAM-1)

| | HPAM-1 (wt. %) | Sil-10 (wt. %) | Hydration Viscosity (cP) | % Improvement in Hydration Viscosity |
|---|---|---|---|---|
| Run-1 | 1.66 | None | 12 | None |
| Run-2 | 1.66 | 0.005 | 15 | 25 |

TABLE 12-continued

Effect of silicon polyether concentration on the hydration viscosity of anionic polyacrylamide polymer (HPAM-1)

|  | HPAM-1 (wt. %) | Sil-10 (wt. %) | Hydration Viscosity (cP) | % Improvement in Hydration Viscosity |
|---|---|---|---|---|
| Run-3 | 1.66 | 0.05 | 20 | 67 |
| Run-4 | 1.66 | 0.1 | 24 | 100 |
| Run-5 | 1.66 | 0.2 | 26 | 117 |
| Run-6 | 1.66 | 0.3 | 27 | 125 |
| Run-7 | 1.66 | 0.4 | 28 | 133 |
| Run-8 | 1.66 | 0.5 | 28 | 133 |

Example 13

Figure 3:
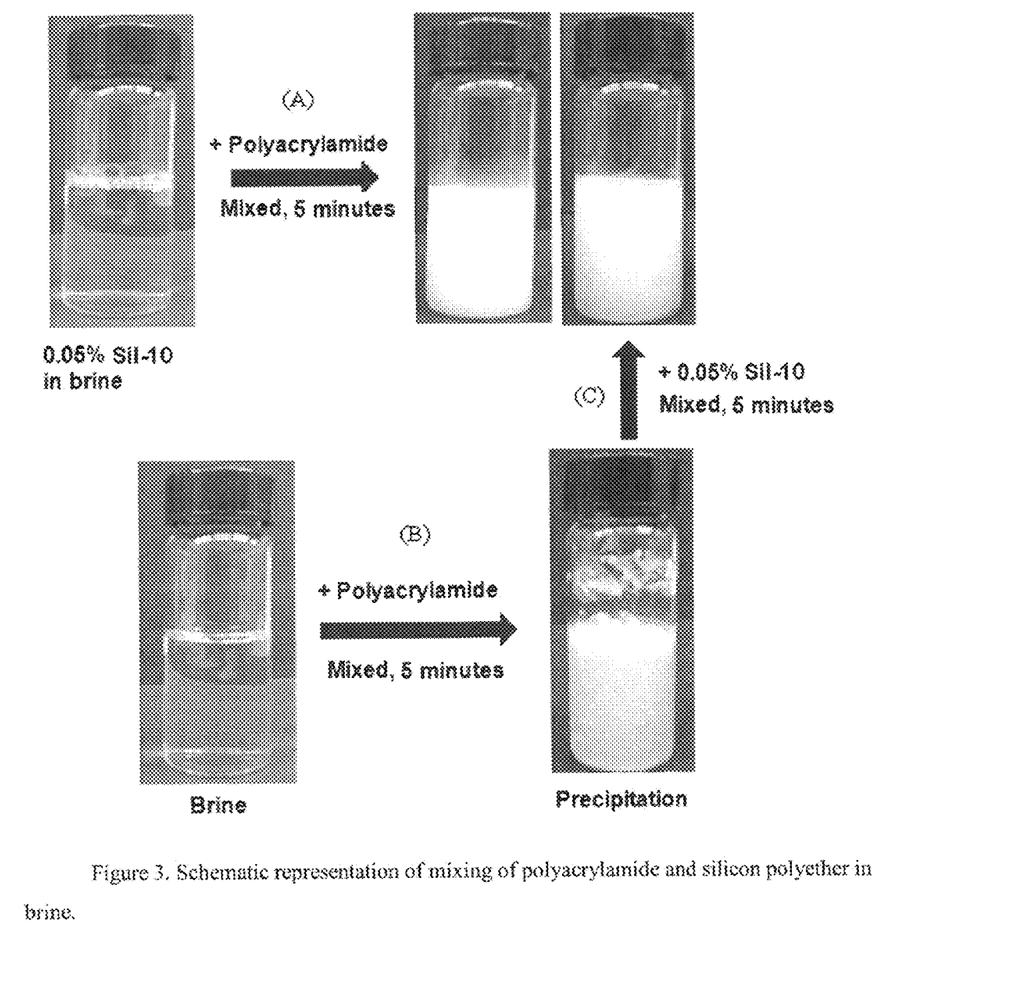
FIG. 3 is a schematic representation of mixing of polyacrylamide emulsion and silicon polyether in brine.
Figure 4:
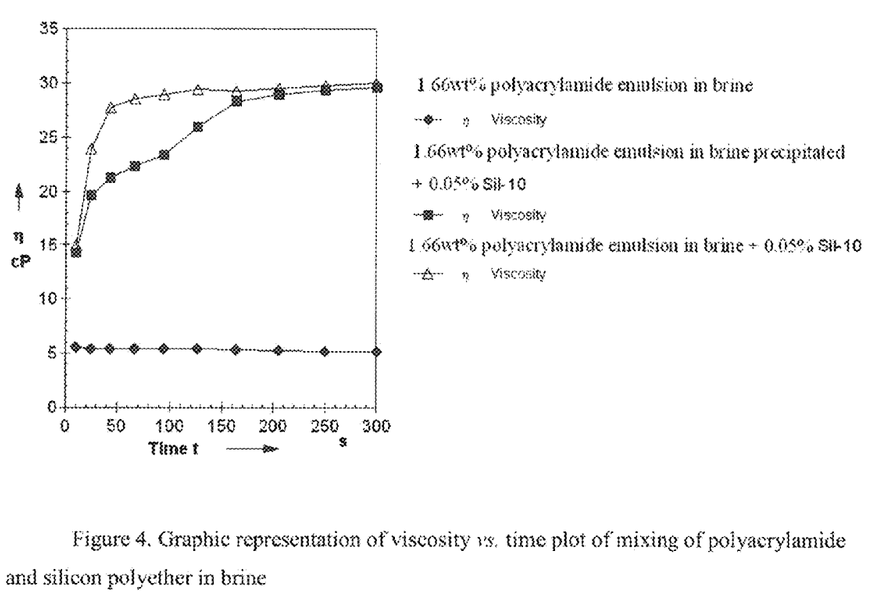
FIG. 4 is a graphic representation of viscosity vs. time plot of fluxing of polyacrylamide emulsion and silicon polyether in brine.

1.66 wt % of polyacrylamide emulsion CPAM-1 was injected to a measured amount of brine containing 0.05% silicon polyether, Sil-10. Similar tests as described in Example 2 were performed and the hydration viscosity was recorded as 27 cP at 300 s (FIG. 3, top left (A) and FIG. 4). When a similar amount of CPAM-1 was injected into the brine and no silicon polyether was added, polyacrylamide precipitated and only minimal hydration and low viscosity (6 cP) was observed, as shown in FIG. 3, bottom scheme (B). As a continuation of this experiment, 0.05% Sil-10 was added to the precipitated mixture. The precipitated polyacrylamide became solubilized in the brine (see in FIG. 3, right scheme, (C)) and a similar magnitude of viscosity (27 cP) was observed. Viscosities vs. time plots fir the experiments conducted in this example are shown in FIG. 4.

Example 14

Friction reduction by various polyacrylamide polymers and the new compositions were measured using a flow loop.

Run 1: The polymer solution was prepared by injecting 0.1 wt % (1 gpt) of polymer emulsion to a measured amount of 10% brine and then mixing it for 5 minutes at 500 RPM with an overhead mixer with four propeller blades. This fluid was then injected into a fluid reservoir and 30 psi pressure was applied. Five hundred mL of polymer solution was allowed to flow via a 318 cm long tube (diameter=0.39 cm) at 30 psi pressure and the flow time was recorded. Similar experiments were performed at 20 psi, 10 psi and 5 psi pressures. The viscosity of the fluid was measured using a rheometer, model Physica MCR 301 (Anton Par, Ashland, Va., USA) at 100 s$^{-1}$ shear rate.

The data obtained from the above experiments were used to calculate the Reynolds number ($R_e$) and the Fanning's Friction Factor using the equations;

$$\text{Fanning's Friction Factor} = f = \frac{d^5 \Delta P \pi^2}{32 L_f \rho Q^2} \text{ and}$$

$$\text{Reynolds Number} = R_e = \frac{4Q\rho}{n\pi d}$$

The values of f and $R_e$ were calculated for every dosage of Friction Reducer and a comparison was made with the base brine under the same conditions. All percent friction reductions were calculated as:

$$\% FR = 100\left(1 - \frac{f_p}{f_s}\right)$$

for $R_e = 15000$;

where subscripts p=polymer solution and s=solvent brine.

Run 2-16: These experiments were conducted following the same procedure as Run-1 (Table-13).

TABLE 13

Friction Reduction data (%) of various polyacrylamide polymer emulsions with silicon polyether copolymer

|  | Polyacrylamide Emulsion | | Silicon Polyether | | Friction Reduction | % Improvement in FR |
|---|---|---|---|---|---|---|
|  | HPAM | Dose (gpt)* | Silicon Polyether | Dose (%) | (%) at Re = 15000 | |
| Run-1 | HPAM-1 | 1 | None | 0 | 33 | 30 |
| Run-2 | HPAM-1 | 1 | Sil-10 | 0.01 | 43 | |
| Run-3 | HPAM-2 | 1 | None | 0 | 17 | 82 |
| Run-4 | HPAM-2 | 1 | Sil-10 | 0.01 | 31 | |
| Run-5 | HPAM-3 | 1 | None | 0 | 21 | 133 |
| Run-6 | HPAM-3 | 1 | Sil-10 | 0.01 | 49 | |
| Run-7 | HPAM-4 | 1 | None | 0 | 23 | 52 |
| Run-8 | HPAM-4 | 1 | Sil-10 | 0.01 | 35 | |
| Run-9 | HPAM-7 | 1 | None | 0 | 24 | 50 |
| Run-10 | HPAM-7 | 1 | Sil-10 | 0.01 | 36 | |
| Run-11 | HPAM-8 | 1 | None | 0 | 27 | 56 |
| Run-12 | HPAM-8 | 1 | Sil-10 | 0.01 | 42 | |
| Run-13 | HPAM-9 | 1 | None | 0 | 30 | 37 |
| Run-14 | HPAM-9 | 1 | Sil-10 | 0.01 | 41 | |
| Run-15 | HPAM-10 | 1 | None | 0 | 30 | 20 |
| Run-16 | HPAM-10 | 1 | Sil-10 | 0.01 | 36 | |

*gpt = gallon/thousand gallon

In the present invention, silicon polyether copolymers are used as an additive with polyacrylamide products to improve the hydration of the polymeric chains. It is disclosed that the inversion of polyacrylamide emulsions and the hydration of the polymeric chains can be accelerated by the presence of small amount of silicon polyether. This feature is evident by the vortex closure and rheology tests (Tables 1-12; Examples 1-13). The faster inversion of emulsion and better hydration of polymeric chains resulted in a higher friction reduction (Table-13; Example 14) and a 20-133% improvement in the friction reduction is observed.

The results obtained from these experiments demonstrate that silicon polyether copolymers accelerated the friction reducing performance of anionic polyacrylamide polymers in brines containing high concentration of monovalent and divalent cations.

In the hydraulic fracturing application ionic polyacrylamides need to solubilize and hydrate in very short period of time, typically 1-2 minutes. In the present invention, superior hydration of polyacrylamide chains is demonstrated by higher magnitude of 'hydration viscosity' values (Tables 1-12; Examples 1-13). Mechanistically, the hydration of polyacrylamide chains and subsequent viscosity development is crucial to achieve higher friction reduction. Hydrated polyacrylamide chains act as better friction reducer as compare to non-hydrated polymer chains.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A friction reducer composition for water based liquids comprising:
   a) an ionic polyacrylamide; and
   b) a silicon polyether;
wherein the silicon polyether is selected from the group consisting of
   1) silicone polyether(s) defined by the formula:

$Me_3Si-O-SiMe(R)-O-SiMe_3$, wherein
   $R=(C_3H_6)O(C_2H_4O)_a(C_3H_6O)_b(C_4H_8O)_cZ$;
   a=4-17;
   b=0-26;
   c=0-26 and
   Z is H, acetyl or a monovalent hydrocarbon group containing from 1 to 12 carbon atoms;
   2) silicone polyether(s) defined by the formula:

$Me_3Si-[OSiMe_2]_x-[O-SiMe(R)]_y-O-SiMe_3$, wherein
   x=0-74;
   y=1-10;
   $R=(C_3H_6)O(C_2H_4O)_a(C_3H_6O)_b(C_4H_8O)_cZ$;
   a=5-17;
   b=0-26;
   c=0-26 and
   Z is H, acetyl or a monovalent hydrocarbon group containing from 1 to 12 carbon atoms;
   3) silicone polyether(s) defined by the formula:

$\{[CH_2CH(OH)CH_2O(CH_2)_3SiMe_2-O-[SiMe_2O]_x-SiMe_2-(CH_2)_3OCH_2CH(OH)][(H)NCH-(CH_3)-CH_2O(C_3H_6O)_b(C_2H_4O)_a CH_2CH(CH_3)N(H)]\}$ wherein
   x=4-100;
   a=5-50 and
   b=3-20;
   4) silicon polyether(s) defined by the formula $H-[N(H)(R^1)R^2Si(OR^3)_{3-a-b-c}(OR^4)_d(R^5Si(OR^6)_d (R^7)_eR^8_c]-N(H)(R^1)R^2Si(OR^3)_3$, wherein
   $R^1$=monovalent hydrocarbon radical containing 1-20 carbon atoms;
   $R^2$=divalent linear or branched hydrocarbon radical containing 1-60 carbon atoms;
   $R^4$=hydrocarbon radical containing 3-200 carbon atoms;
   $R^5$=selected from a group consisting of oxygen or a divalent linear or branched hydrocarbon radical containing 1-60 carbon atoms;
   $R^3$, $R^6$, $R^7$ and $R^8$=monovalent linear or branched hydrocarbon radical containing 1-200 carbon atoms;
   a, b, c=0-3; subject to the limitation that a+b+c≤3 and d, e=0-3; subject to the limitation that d+e≤3; and
   5) silicon polyether(s) defined by the formula:

$Me_3Si(C_2H_4)SiMe_2(C_3H_6O)(C_2H_4O)_xZ$, wherein
   x=3-17 and
   Z is H, acetyl or a monovalent hydrocarbon group containing from 1 to 12 carbon atoms.

2. The composition of claim 1 wherein said composition is an emulsion.

3. The composition of claim 2 wherein said emulsion is an oil-in-water emulsion.

4. The composition of claim 2 wherein said emulsion is a water-in-oil emulsion.

5. The composition of claim 1 wherein the composition is solid.

6. The composition of claim 1 wherein said polyacrylamide is an anionic polyacrylamide.

7. The composition of claim 1 wherein said polyacrylamide is a cationic polyacrylamide.

8. The composition of claim 1 wherein said component "b" is 1% to 9% of the composition.

9. A friction reduction method for treating an aqueous fluid comprising:
   combining an ionic polyacrylamide and a silicon polyether with said aqueous fluid;
wherein said silicon polyether is selected from the group consisting of
   1) silicone polyether(s) defined by the formula:

$Me_3Si-O-SiMe(R)-O-SiMe_3$, wherein
   $R=(C_3H_6)O(C_2H_4O)_a(C_3H_6O)_b(C_4H_8O)_cZ$;
   a=4-17;
   b=0-26;
   c=0-26 and
   Z is H, acetyl or a monovalent hydrocarbon group containing from 1 to 12 carbon atoms;
   2) silicone polyether(s) defined by the formula:

$Me_3Si-[OSiMe_2]_x-[O-SiMe(R)]_y-O-SiMe_3$, wherein
   x=0-74;
   y=1-10;
   $R=(C_3H_6)O(C_2H_4O)_a(C_3H_6O)_b(C_4H_8O)_cZ$;
   a=5-17;
   b=0-26;
   c=0-26 and
   Z is H, acetyl or a monovalent hydrocarbon group containing from 1 to 12 carbon atoms;
   3) silicone polyether(s) defined by the formula:

$\{[CH_2CH(OH)CH_2O(CH_2)_3SiMe_2-O-[SiMe_2O]_x-SiMe_2-(CH_2)_3OCH_2CH(OH)][(H)NCH-(CH_3)-CH_2O(C_3H_6O)_b(C_2H_4O)_a CH_2CH(CH_3)N(H)]\}$ x=4-100;
   a=5-50 and
   b=3-20;
   4) silicon polyether(s) defined by the formula:

$H-[N(H)(R^1)R^2Si(OR^3)_{3-a-b-c}(OR^4)_d(R^5Si(OR^6)_d (R^7)_eR^8_c]-N(H)(R^1)R^2Si(OR^3)_3$, wherein
   $R^1$=monovalent hydrocarbon radical containing 1-20 carbon atoms;
   $R^2$=divalent linear or branched hydrocarbon radical containing 1-60 carbon atoms;
   $R^4$=hydrocarbon radical containing 3-200 carbon atoms;
   $R^5$=selected from a group consisting of oxygen or a divalent linear or branched hydrocarbon radical containing 1-60 carbon atoms;
   $R^3$, $R^6$, $R^7$ and $R^8$=monovalent linear or branched hydrocarbon radical containing 1-200 carbon atoms;
   a, b, c=0-3; subject to the limitation that a+b+c≤3 and d, e=0-3; subject to the limitation that d+e≤3;

and 5) silicon polyether(s) defined by the formula:

x=3-17 and

Z is H, acetyl or a monovalent hydrocarbon group containing from 1 to 12 carbon atoms.

10. The method of claim 9 wherein the ionic polyacrylamide is in an emulsion.

11. The method of claim 9 wherein the ionic polyacrylamide is a solid.

12. The method of claim 9 wherein the aqueous fluid is brine.

13. The method of claim 12 wherein the brine contains up to about 15% NaCl and 5% $CaCl_2$.

14. The method of claim 12 wherein the aqueous fluid contains KCl and/or polyDADMAC and the ionic polyacrylamide is a cationic polyacrylamide.

15. The method of claim 9 wherein the aqueous fluid is a water based hydraulic fracturing fluid and the method further includes injecting said hydraulic fracturing fluid into a rock formation containing crude oil and/or natural gas.

16. The method of claim 15 wherein the friction reducer composition can be added to water and/or brine at a dosage rate of from 0.25 to 5 gallons of friction reducer composition to 1,000 gallons of water or brine.

17. The method of claim 9 wherein the treated aqueous fluid is combined with a drilling mud and the method include pumping said drilling mud into a well bore during a drilling operation.

* * * * *